United States Patent [19]

Ahlberg

[11] Patent Number: 4,570,228

[45] Date of Patent: Feb. 11, 1986

[54] APPARATUS IN TAXIMETERS FOR COACTION BY TELETRANSMISSION WITH A COMMON CALCULATOR UNIT

[75] Inventor: Krister Ahlberg, Halmstad, Sweden

[73] Assignee: Haldex AB, Halmstad, Sweden

[21] Appl. No.: 416,020

[22] Filed: Sep. 8, 1982

[30] Foreign Application Priority Data

Mar. 11, 1980 [SE] Sweden ................. 8001901

[51] Int. Cl.[4] ............................. G07B 13/04
[52] U.S. Cl. ..................... 364/467; 235/45; 377/24
[58] Field of Search ............. 364/467, 561, 565; 235/30 R, 45; 377/16, 20, 24

[56] References Cited

U.S. PATENT DOCUMENTS

| | | | |
|---|---|---|---|
| 3,818,186 | 6/1974 | Harwood | 235/45 |
| 3,931,508 | 1/1976 | Kelch | 364/467 |
| 3,970,827 | 7/1976 | Ikuta et al. | 364/467 |
| 4,001,560 | 1/1977 | Larsen | 364/467 |
| 4,118,775 | 10/1978 | Boyce | 364/467 |
| 4,160,155 | 7/1979 | Steele et al. | 364/467 |
| 4,205,388 | 5/1980 | Steiner | 364/467 |
| 4,212,069 | 7/1980 | Baumann | 364/467 |
| 4,240,146 | 12/1980 | Iles | 364/467 |

Primary Examiner—Gary Chin
Attorney, Agent, or Firm—Robert E. Burns; Emmanuel J. Lobato; Bruce L. Adams

[57] ABSTRACT

The invention relates to taximeter installations including mobile taximeter apparatus (2) coacting via radio (3, 4) with a central computer (1). Each taximeter (2) includes registers (15, 26) for collecting pulses relating to travelled distance and consumed time, the central computer (1) initiating periodic read-out (20, 21, 29, 30) of the register content, inter alia for fare price calculation. The central computer also sets a criterion frequency value, so that the pulses related to travelled distance are prevented by means of a circuit (9) from being stored in the register (15) when the frequency of said pulses falls below the criterion frequency, time pulses being stored in a register (26) when the criterion frequency is not attained by the travelled distance pulses.

11 Claims, 1 Drawing Figure

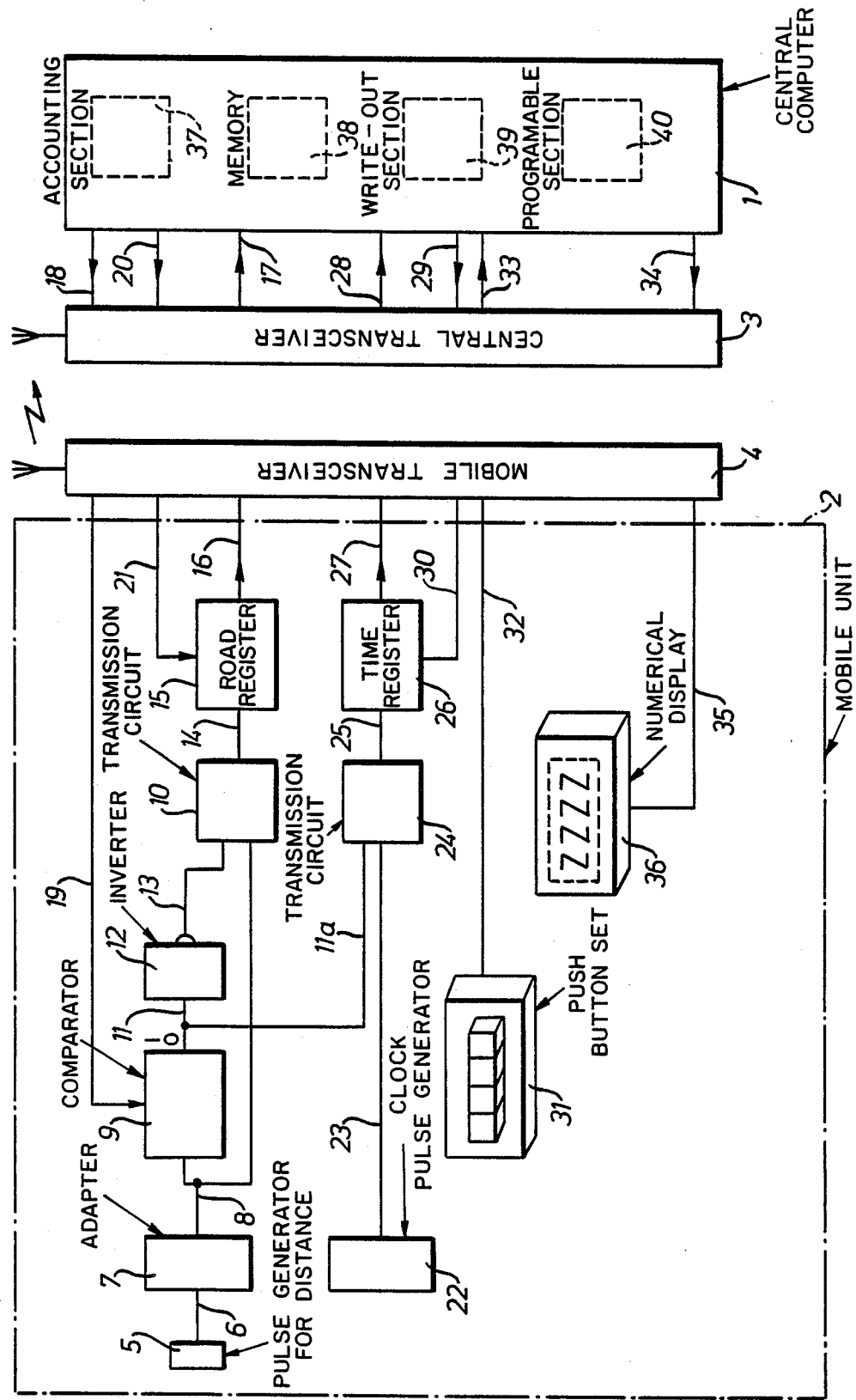

APPARATUS IN TAXIMETERS FOR COACTION BY TELETRANSMISSION WITH A COMMON CALCULATOR UNIT

BACKGROUND OF THE INVENTION

In the taxi or cab service there are constant attempts at rationalization, and computers are coming more and more into the question in this respect as a solution for supervising taxi handling, e.g. for directing the different taxis from the point of view of travelling to suitable pick-up points. Another application may be to take care of the calculation of different tariffs and travelling distances for the cooperating taxis. In such cases it becomes necessary to arrange radio communication between the taxis and a centrally located computer. The probable arrangement in such a system would be that a computer with a radio communication unit is placed centrally in a population center or other region for a given taxi service area. In such a connection it is naturally most rational to allow the computer to carry out all of the calculations of the actual fare as well as statistical information, the computer then also registering information as to selected tariff, distance driven, travelling time, sum due and the like. This means that in the vehicle the taximeter itself would only constitute an indicator unit and a generating unit for tariff information, distance and time. The problem may appear to be easily solved theoretically, but in practice there immediately occur substantial difficulties, which are primarily concerned with the load on the radio communication network in question. All of the taxis running at the same time cannot transmit information continuously on one channel, and a special channel would be needed for each taxi. This is quite impossible from the frequency distribution point of view, and another solution is therefore required. In order to analyze the problem it is suitable to take into account, first of all, the conditions prevailing with respect to a taximeter.

The cost of a fare on a taximeter is generally calculated as the sum of the higher alternative at each instant of a tariff which is based either on time or on distance. The time-dependent tariff is selected automatically when the vehicle speed falls below a given threshold speed, and the distance-dependent tariff when the speed exceeds the threshold speed. In electronic taximeters, this functions so that a constant pulse frequency (clock pulses) is compared with a pulse frequency dependent on road speed. When the speed-dependent frequency is lower than the clock frequency, the journey is debited according to the time-dependent tariff, and according to the distance-dependent tariff when the frequency is higher. For the selection of the right tariff (distance or time) it is usual to arrange a frequency comparison about twice per travelled meter, i.e. with high repetition frequency. In practice, this means that if it is desired to arrange a central computer to carry out the calculation of the fare, radio transmission would be necessary twice per driven meter or the corresponding time interval. This would lead directly to unacceptable consequences from the point of view of radio communication.

SUMMARY OF THE INVENTION

The present invention relates to a solution of the problem under discussion. The invention is essentially concerned with providing the taximeter with a comparator circuit and two registers, where one register is stored with information during the time when the vehicle speed is below a threshold speed, and the other register stores information in relation to the distance when the vehicle speed exceeds said threshold speed. The stored information is disposed for transmission to the computer upon a request from it, and for short intervals which are periodically repeated, e.g. every tenth second. The demands on the radio network are thus drastically reduced. The computer is further adapted to calculate the current fare price from the transmitted information, i.e. the kilometer price times driven distance above said threshold speed plus the current hourly price times time taken below threshold speed. The computed information is then transmitted to the appropriate taximeter. As long as the threshold speeds do not need to be changed, tariff alterations can be carried out entirely in the central computer, which is very rapid compared with handling them on each taximeter. Possible basic tariff changes can be carried out simultaneously for all taxis, and the tariff alteration percentage for abnormal working time can naturally also be carried out without difficulty. There is also the facility, which increases flexibility, of allowing the computer to program the appropriate threshold speed, e.g. in response to traffic density or other driving conditions. As is customary in full-sized computers, statistics regarding driving and debiting can easily be obtained.

What is characterizing for the present invention will be apparent from the following description.

BRIEF DESCRIPTION OF DRAWING

The invention will now be described in detail while referring to the appended drawing, which illustrates an embodiment of the invention in the form of a block diagram.

DESCRIPTION OF PREFERRED EMBODIMENT

The apparatus illustrated in the drawing comprises two main parts, namely the rectangle 1 denoting a centrally situated computer installation, and the chain-dotted rectangle 2 denoting a mobile unit mounted in a taxi (not shown) and coacting with the computer. There is radio communication between these units via transceiver units 3 connected to the computer and transceiver units 4 in the taxis.

The mobile unit 2 comprises a pulse generator 5 for distance, i.e. a device connected to the wheels of the vehicle for generating pulses in response to wheel rotation. This so-called pulse transmitter is connected via a line 6 to an adapting unit 7, the output of which is in communication with a comparator circuit 9 via a line 8, and with a signal condition-controlled transmission circuit 10. The comparator circuit 9 is connected via a line 11 to an inverting circuit 12, which is in communication with the second input of the transmission circuit 10 via a line 13. The output of circuit 10 is fed via a line 14 to a memory unit 15 here denoted "road register". This road register 15 is connected to the transmitter in the unit 4 via a line 16 for transmitting information to the computer 1 via the receiver in unit 3 and a line 17. Information concerning the threshold speed is fed out via a line 18 from the computer 1 to the transmitter in the unit 3 and from there to the reciever in the unit 4, which transfers the information to the comparator circuit 9 via a line 19. Release signals for taking out register information contents are transferred from the computer 1 via a line 20 to the transmitter in unit 3, for transmission to the receiver in unit 4 and transfer via a line 21 to the road register 15.

The mobile unit 2 further includes a clock pulse circuit 22 for generating time pulses connected via a line 23 to one input of a signal condition-controlled transmission circuit 24, the second input of which is connected by a line 11a to the line 11 from the comparator circuit 9. The output of the circuit 24 is connected via a line 25 to a time pulse register 26, denoted here "time register". The output from this register is connected via a line 27 to the radio unit 4 for transmitting information to the computer 1 via a line 28. Release signals for taking out register information contents are transferred via a line 29 to the transmitter in unit 3 for transmission to the receiver in unit 4 and transfer via a line 30 to the time register 26.

In the mobile unit 2 there is arranged an operating push button set 31, which transmits information via a line 32, and the radio link, to the input line 33 of the computer. A seventh line 34 goes from the computer 1, for transmitting signals, also via radio, to a line 35 for controlling a numerical display 36, which indicates the current fare price.

The apparatus functions in the following manner. During a journey with a taxi, so-called "road pulses" are generated in the road pulse transducer 5, and are transferred via the line 6 to the adapting unit 7 for converting the pulses obtained into a number of pulses suitable for processing in subsequent circuits. The output pulses from the circuit 7 are fed by line 8 to the comparator circuit 9 and also to the transmission circuit 10. The comparator circuit is such that on its output it has a "0" or a "1" condition depending on whether the pulse frequency from the circuit 7 exceeds the threshold value set by the computer 1 or not. It is now assumed that the pulse frequency is higher than the threshold value, a "0" condition thus being present on the line 11. This means that after the inverting circuit 12 there is a "1" condition on the line 13, and this in turn means that the transmission circuit 10 is open for transmitting pulses from the adapting unit 7 via the lines 8 and 14 to the road register 15 for storing information. Furthermore, there is a "0" condition on the line 11a at one input of the transmission circuit 24, this in turn causing said circuit 24 to block the transmission of time pulses from the clock pulse circuit 22 to the time pulse register 26. The computer, which controls the periodical communication with the mobile unit, is now assumed to send a register releasing pulse via the lines 20 and 21 to the road register 15. There is thus initiated return transmission on the line 16 of the information stored in said register, via radio to the line 17 connected to the computer 1, the road register 15 being simultaneously zeroed for receiving new information. These register releasing pulses on the lines 20, 21 can be transmitted in response to the availability of an unengaged radio channel, whereat the computer can simultaneously ensure that the receiving radio channel is free for transmission of information on lines 16 and 17. Previously received information regarding road pulses is processed in the computer 1 according to a predetermined program, the result in the form of fare price indication being sent on the line 34 to the line 35 over the appropriate radio link, for indicating at the taximeter the fare price on the numerical display 36. For the described operations to be initiated it is necessary for the taxi-driver to have previously actuated one of the push buttons in the set 31, e.g. one selecting a special fare tariff according to the number of passengers or other similar conditions.

If it is now assumed that the speed of the vehicle becomes so low that is falls under the programmed threshold speed, the comparator circuit 9 will then not maintain the "0" condition on its output line 11. The appropriate input on the circuit 24 will therefore assume a "circuit-open" condition. Pulses generated by the clock pulse circuit 22 are now fed via the line 23 to the circuit 24 and via the line 25 to the time pulse register 26. Entirely analogous with what takes place in the road register circuit 15 there are obtained register releasing pulses from the computer 1 on the line 29 and on the line 30 via the radio link, these pulses causing return transmission of stored pulses in the time register over the line 27 and the radio link to the line 28, after which the circuit is zeroed. Transmission of the register release pulses suitably takes place via the lines 20 and 29 and over the radio link, in succession with a given time difference, so that the same radio communication can be utilized without changing channels for making use of the required information. The time pulses, as with the road pulses, are processed by the computer so that the final result is indicated on the numerical display 36.

One completing a journey, the taxi-driver depresses the push button in the set 31 corresponding to the fare price, final fare price information being transmitted from the computer to the numerical display 36. After zeroing to "free" position by depressing the appropriate button in the set 31, communication continues between the computer 1 and the mobile unit 2. The computer maintains a periodic enquiry of all the taximeters the whole time, thus a taximeter is still questioned even when it is "free". The reason for this is that all transmission should be initiated by the computer, to avoid confusion on the frequencies. Information transmission from the computer for setting threshold speeds may take place, for example, at the juncture between "free" and "engaged" states of the taximeter, for subsequent storage in the taximeter during the journey. The advantage with the installation as described above, is, inter alia, that it is not necessary to load radio communication between computer and the mobile units other than for extremely short periods. In practice, transmission of registered pulses may take a time of some tenths of a second and the process may possibly be even shorter. The pulses in question, their frequency and pulse duration can naturally be varied and suited to appropriate equipment and needs. The information in the time and road registers may, for example, indicate the number of 0,1 sec. intervals below the threshold speed and the number of 1 meter intervals above the threshold speed, respectively. Furthermore, the selected tariff can be controlled in other ways, e.g. by seat switches indicating the number of persons in the vehicle instead of using the push buttons.

It should be noted that further means can be connected to such a mobile unit, e.g. for reading a passenger's credit card for transmission to the computer via the radio link, so that the passenger's bank account is automatically charged with the amount to be debited. Inter alia for this purpose, the computer is equipped with an accounting section, here only denoted by a dashed block 37. The computer also includes a memory section 38, a write-out section 39 and a programable section 40 for information on current tariffs. As previously mentioned, a journey-directing supervisory section can also be included in the computer, although this is no part of the present invention. Solutions may also be conceived in which the numerical display has a capacity such that it can be caused to give the address of a called-for pick-up point for collecting passengers.

In order to save radio transmission time still further, especially for regions in large towns, it may be suitable to subdivide the mobile units into a number of groups. To solve the information transmission problem, the procedure may be such that the computer sends a time-marking pulse declaring an output time for each group, each mobile unit then being provided with a time measurement circuit 41, which is started on the reception of said time marking pulse. The units within the pertinent group are arranged to send appropriate registering information by means of their respective time measuring circuits after a given time interval from the time marking pulse reception, which has been predetermined for each unit. There is thus only required from the computer side that an initiation pulse is sent for releasing the different registers of a whole group, which is extremely efficient. The time measurement circuits must naturally be mutually, accurately adjusted. A plurality of embodiments may be conceived within the scope of the invention, e.g. a clock pulse generator with associated circuits can be built into the computer, so that only distance register pulses need be transmitted together with indicating pulses denoting when the threshold speed has not been met, or solely road register pulses may be transmitted, which are then coordinated with with time pulses by frequency calculations. Tariff resetting can naturally be performed in a manner other than with push buttons 29, as shown here, and the indication of the fare price may be effected by some form of printing device, for example. It is naturally not necessary to use radio for transmitting the information to the computer 1, and other communication forms are conceivable, including supersonic transmitters and receivers mounted on building walls or the like, in the taxi service region in question.

I claim:

1. Apparatus for calculating taxi fares, comprising a central unit and a mobile unit in each, of a plurality of taxis,
    said mobile unit comprising means responsive to the distance travelled by the taxi for generating distance information, clock means for generating elapsed time information, first register means for storing said distance information, second register means for storing said elapsed time information,
    means for enabling the transmission of distance information from said distance information generating means to said first register means only when the taxi is travelling at a speed above a threshold speed and for enabling the transmission of elapsed time information from said clock means to said second register means when the taxi is stopped or is travelling at a speed below said threshold speed, means for transmitting the stored distance and time information to said central unit, means for receiving from said central unit a calculated fare and means for displaying said calculated fare, and
    said central unit comprising means for controlling said enabling means of said mobile units to change said threshold speed, means for periodically and sequentially initiating the transmittal of stored distance and time information from said mobile units of said taxis, memory means for receiving and storing said information, computer means for calculating the fare for each taxi from said stored information and means for transmitting the calculated fares to said taxis.

2. Apparatus according to claim 1, in which said distance information generating means comprises means for generating distance pulses at a frequency corresponding to the speed of said taxi and said elapsed time information generating means comprises means for generating clock pulses of a fixed frequency.

3. Apparatus according to claim 2, in which said first and second register means comprise means for receiving and storing information in the form of binary states.

4. Apparatus according to claim 3, in which said enabling means comprises means for comparing the frequency of said distance pulses with the frequency of said clock pulses and feeding said distance pulses to said first register means when said distance pulses have a frequency higher than a set frequency determined by said threshold speed and feeding said clock pulses to said second register means when said distance pulses have a frequency below said set frequency.

5. Apparatus according to claim 1, in which each mobile unit includes means for signalling said central unit that a trip has been completed and requesting a calculated fare.

6. Apparatus according to claim 1, in which each mobile unit includes means for transmitting to said central unit information affecting tariff rates.

7. Apparatus for calculating taxi fares, comprising a central unit and a mobile unit in each of a plurality of taxis,
    said mobile unit comprising first means for generating pulses proportional to the distance travelled by the taxi, first register means for storing distance information in the form of binary states, second means for generating clock pulses, second register means for storing time information in the form of binary states, means for transmitting said distance pulses to said first register means only when the speed of said taxi is above a threshold speed and for transmitting said clock pulses to said second register means only when said taxi is stopped or travelling at a speed below said threshold speed, first transceiver means for transmitting to said central unit on command distance and time information stored in said first and second register means, and means for displaying fares received through said first transceiver means from said central unit, and
    said central unit comprising second transceiver means for receiving said distance and time information from mobile units, means for transmitting through said second transceiver means a signal to all mobile units to change said threshold speed and computer means for storing and processing said information to determine applicable fare, means for generating signals transmitted to mobile units through said second transceiver means for periodically and sequentially initiating transmittal of said information from mobile units to said central unit, and means for generating a signal transmitted to respective mobile units through said second transceiver means to activate said means for displaying a fare.

8. Apparatus according to claim 7, in which said means for transmitting pulses from said first and second pulse generator means to said first and second register means comprises first gate means controlling the transmission of pulses from said first pulse generating means to said first register means, second gate means controlling the transmission of pulses from said second pulse generating means to said second register means, and means responsive to the frequency of pulses generated by said first pulse generating means for controlling said first and second gate means to transmit pulses from said first pulse generating means to said first register means only when the frequency of pulses from said first pulse generating means is above a set frequency and to transmit pulses from said second pulse generating means to said second register means only when the frequency of pulses from said first pulse generating means is below said set frequency.

9. Apparatus according to claim 7, in which each of said mobile units includes means for transmitting to said central unit through said first transceiver means information affecting fare computation.

10. Apparatus according to claim 7, in which each of said mobile units includes means for transmitting to said central unit through said first transceiver means a signal indicating completion of a trip and requesting fare information.

11. Apparatus for calculating taxi fares, comprising a central unit and a mobile unit for each of a plurality of taxis, said mobile unit comprising means responsive to the distance travelled by the taxi for generating distance information, clock means for generating elapsed time information, means for storing said distance information only when the speed at which the taxis is travelling is above a threshold speed and for storing said elapsed time information only when the taxi is stopped or is travelling at a speed below said threshold speed, means for transmitting the stored distance and time information to said central unit, and means for receiving from said central unit and displaying a calculated fare, and said central unit comprising means for periodically and sequentially initiating transmission of said stored distance and time information from said mobile units to said central unit, means for receiving and storing said information, means for calculating the fare for each taxi from said stored information and means for transmitting the calculated fares to said taxis, each mobile unit including means for sequentially timing the transmission of information to said central unit in order to effect transmission sequences within a given short time period, the transmission being initiated by said central unit which thus starts the said means for sequential timing of each mobile unit.

* * * * *